United States Patent

Colson, Jr.

[11] Patent Number: 5,870,849
[45] Date of Patent: Feb. 16, 1999

[54] WRAPPING DEVICE FOR TUBULAR MEMBERS

[76] Inventor: Curtis P. Colson, Jr., 123 Oak Blvd., Waveland, Miss. 39576

[21] Appl. No.: 752,176

[22] Filed: Nov. 18, 1996

[51] Int. Cl.$^6$ .................................................. A01K 97/06
[52] U.S. Cl. ............................... 43/25.2; 24/306; 24/442
[58] Field of Search ..................... 43/25.2, 57.1; 24/306, 442; 128/DIG. 15

[56] References Cited

U.S. PATENT DOCUMENTS

| | | | |
|---|---|---|---|
| 309,028 | 12/1884 | Byington . | |
| 2,993,293 | 7/1961 | Blout | 43/57.5 |
| 3,000,384 | 9/1961 | Piers, Jr. | 24/17 A |
| 3,067,537 | 12/1962 | Gregory et al. | 43/25.2 |
| 3,086,529 | 4/1963 | Munz et al. | 128/DIG. 15 |
| 3,199,243 | 8/1965 | Caston | 43/26 |
| 3,279,008 | 10/1966 | Wallach | 24/306 |
| 3,372,438 | 3/1968 | Rinecker | 24/450 |
| 3,425,150 | 2/1969 | Braese | 43/25.2 |
| 3,827,107 | 8/1974 | Moore | 24/16 R |
| 3,841,648 | 10/1974 | Meyer | 24/306 |
| 3,940,873 | 3/1976 | Lawless | 43/57.5 |
| 4,005,506 | 2/1977 | Moore | 24/68 E |
| 4,149,540 | 4/1979 | Hasslinger | 24/16 R |
| 4,273,130 | 6/1981 | Simpson | 128/DIG. 15 |
| 4,418,490 | 12/1983 | Ancona | 43/25.2 |
| 4,457,095 | 7/1984 | Stevenson | 43/25.2 |
| 4,640,039 | 2/1987 | O'Neill | 43/21.2 |
| 4,701,149 | 10/1987 | Breil | 24/306 |
| 4,759,963 | 7/1988 | Uso, Jr. et al. | 43/54.1 |
| 4,780,983 | 11/1988 | Smith | 43/54.1 |
| 4,854,015 | 8/1989 | Shaull | 24/16 R |
| 4,864,698 | 9/1989 | Brame | 24/450 |
| 4,878,274 | 11/1989 | Patricy | 24/306 |
| 4,939,818 | 7/1990 | Hahn | 24/442 |
| 4,942,690 | 7/1990 | Lund | 43/42.12 |
| 5,002,212 | 3/1991 | Charleton | 24/442 |
| 5,020,264 | 6/1991 | Demski | 43/25.2 |
| 5,104,076 | 4/1992 | Goodall, Jr. | 24/306 |
| 5,131,180 | 7/1992 | Ives | 43/25.2 |
| 5,200,245 | 4/1993 | Brodrick, Jr. | 24/306 |
| 5,214,874 | 6/1993 | Faulkner | 43/25.2 |
| 5,595,014 | 1/1997 | Moore | 43/54.1 |
| 5,598,658 | 2/1997 | Walker | 43/25.2 |
| 5,603,591 | 2/1997 | McLellan | 24/442 |
| 5,604,961 | 2/1997 | Cole | 24/442 |
| 5,617,668 | 4/1997 | Shimandle | 43/44.8 |
| 5,636,503 | 6/1997 | Kaspszyk | 54/23 |
| 5,693,401 | 12/1997 | Sommers et al. | 24/442 |

FOREIGN PATENT DOCUMENTS

| | | | |
|---|---|---|---|
| 2027116 | 2/1980 | United Kingdom | 24/442 |
| 2237062 | 4/1991 | United Kingdom | 24/306 |
| 2241987 | 9/1991 | United Kingdom | 24/442 |

*Primary Examiner*—Michael J. Carone
*Assistant Examiner*—Darren Ark

[57] ABSTRACT

A non-stretchable wrapping device particularly suitable for tubular members having a smooth surface such as rod components of a rod and reel system, which would include a substantially planar member having first and second surfaces, with at least a portion of the first surface securable to a portion of the second surface of the planar member. A second portion of the second surface of the member would be covered with a non-slip rubber-like material with the rubberized-like material frictionally adherable to the smooth surface of the tubular member such as a fishing rod, so that the planar member may be wrapped around the fishing rod, and the portion of the first surface would adhere to the portion of the second surface for maintaining the planar member tightly wrapped around the rod. Furthermore, the planar member would be of sufficient length to wrap around the rod and wrap around either a second portion of the rod or a fishing lure at the end of the fishing line extending from the rod in order to secure the lure and the rod components together within the wrapped member.

16 Claims, 3 Drawing Sheets

WRAPPING DEVICE FOR TUBULAR MEMBERS

BACKGROUND OF THE INVENTION

1. Field of the Invention

The apparatus of the present invention relates to wrapping devices. More particularly, the present invention relates to a device for wrapping around a smooth surface of a tubular member, such as a fishing rod, for engaging the fishing rod and other components within the wrap, with the wrap including surfaces for allowing it to frictionally adhere to the tubular member and to engage upon itself to maintain itself wrapped around the member.

2. General Background of the Invention

In addressing the background of this invention, one would look principally to the fishing industry. In most instances, when one fishes, there is the use of a rod and reel, with the rod normally of the type fabricated of several tubular components engaged to one another end to end, so that the fishing line can be threaded through the eyelets of the rod and the hook, bait or lure may be engaged on the end of the line for fishing. There are numerous practical problems which need to be addressed during fishing in order to maintain the integrity of the fishing line, the lure and the fishing rod for immediate and ease of use. Several of the more principal problems are explained below. First, normally when one is transporting the rod to an initial fishing spot, the rod has been disengaged into its several components, which are then placed side by side. Normally the fishing line is maintained on the rod, and often times the fishing hook or lure is positioned at the end of the line. Therefore, when the rod is disengaged and its members are side by side, quite often the fish hook on the end of the line or lure becomes tangled with the line on the second component of the rod, which results in difficult disengagement. Worse yet, when one has assembled a number of rods which have been disassembled in that fashion, quite often the plurality of rods become entangled with one another and it is difficult and sometimes impossible to disengage them for use.

The second problem which one confronts is that after one has been fishing in a certain spot, for example, in a boat, and wishes to move to a second spot, the rods are normally laid on the bottom of the boat or in the rod racks, and the fishing lure or bait at the end of the line is usually engaged into one of the eyelets so that the hooks on the lure are not free-swinging. Again, what one encounters is an entanglement between the hooks and the line of the rod, and like the former problem, should there be multiple rods laying in a group, then invariably it seems, the lines become tangled and the hooks and/or lures must be cut away from the lines in order to untangle the various lines of the multiple rods.

Likewise, in the fishing industry, there is a need for that when the rods are disassembled, or when the rods are placed into the rod racks adjacent to one another, there is a need to have the lines properly engaged against the rods so that the free ends of the lines which may contain hooks or lures do not become tangled with the free ends or with the lines of other rods.

This type of problem is not only confronted with rods and reel in the industry, but often times, tubular members such as light weight pipe such as lengths of PVC pipe or other types of pipe when transported in multiple lengths, and there is a need to somehow maintain the lengths in a relatively compact format so that they can be easily transported.

Several patents have been located in the art which attempt to address these problems, and these patents are as cited in the applicant's prior art statement which is being submitted herewith.

BRIEF SUMMARY OF THE INVENTION

The apparatus of the present invention solves the shortcomings in the art in a simple and straight forward manner. What is provided are multiple embodiments of a wrapping device particularly suitable for tubular members having a smooth surface such as rod components of a rod and reel system, the wrapping device which would include a substantially planar member having first and second surfaces, with at least a portion of the first surface securable to a portion of the second surface of the planar member. A second portion of the second surface of the member would be covered with a non-slip rubber-like material with the rubber-like material frictionally adhereable to the smooth surface of the tubular member such as a fishing rod, so that the planar member may be wrapped around the fishing rod, and the portion of the first surface would adhere to the portion of the second surface for maintaining the planar member tightly wrapped around the rod. Furthermore, the planar member would be of sufficient length to wrap around the rod and wrap around either a second portion of the rod or a fishing lure at the end of the fishing line extending from the rod in order to secure the lure and the rod components together within the wrapped member. It should be noted that the portion of the first surface and the portion of the second surface which adhered to one another comprised plastic type fuzzy material and plastic type loops respectively together commonly known as Velcro® or the like. Velcro® is a registered trademark of Velcro Industries. There may be further included a lever member secured to at least one end of the planar member for holding in place against the surface of the rod as the planar member is wrapped around the rod to be adhered to. There may be also further included a tab member secured to at least a second end of the planar member for releasing the planar member after the member has been wrapped around the rod and adhered thereto.

Therefore, it is the principal object of the present invention to provide an apparatus for wrapping around one or more tubular members or other components for securing the members and components within a single wrap with the wrap held in place by surfaces contacting and adhering to one another.

It is a further principal object of the present invention to provide a member for wrapping around a tubular member and other components which includes a non-slip plastic rubber-like surface which when positioned against the smooth surface of the tubular member, will frictionally adhere to the smooth surface and allows one to hold one end of the wrap in place while the second end of the wrap is wrapped around the members and engaged upon itself.

It is a further object of the present invention to provide a wrapping member having multiple type surfaces with one of the surfaces being a non-slip surface for frictionally adhering to the smooth surface of a tubular member and the other surfaces being the components of Velcro® which allow them to adhere to one another after the wrap has been secured around the tubular members so that they do not unwrap until a person will pull them apart.

It is a further object of the present invention to provide a planar member which may be cut into multiple lengths and widths for wrapping around a series of tubular members or other components for example, lures or fishing hooks of a rod and reel assembly, so that the fishing lure and hooks are tightly wound around the surface of the rod, and are not allowed to be swinging free as the rod is placed in storage or during transport of the rod and reel assembly.

It is a further object of the present invention to provide a versatile holder for fastening an article such as a fishing lure, cork, floater or the like to a fishing rod.

It is a further object of the present invention to address the problem of tangled line by securing a hook, sinker, cork screw or bit against the rod surface.

It is a further object of the present invention to make use of a non-skid product which results as a secure positioning to taut lines along the rod as desired by the user.

It is a further object of the present invention to provide a holder for a quick means of both securing and releasing an article, where the article can be located at any position along the rod surface in order to release the lure or bait without reeling the article to cast position.

It is a further object of the present invention to fit on any rod and is suited for various fishing skill levels such as tournament fishing, sport fishing and is not limited to location of bait.

It is a further object of the present invention to address the ability for securing additional articles as may be desired by the user along the rod such as a second lure or bait.

It is a further object of the present invention that once the lure or bait is released, the holder can be secured at any location along the rod or as desired by the user to allow for flexibility of individuals fishing practice.

It is a further object of the present invention to provide a holder which is simply manufactured and is of low cost and can be affordable to most people who practice the art of fishing.

BRIEF DESCRIPTION OF THE SEVERAL VIEW OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
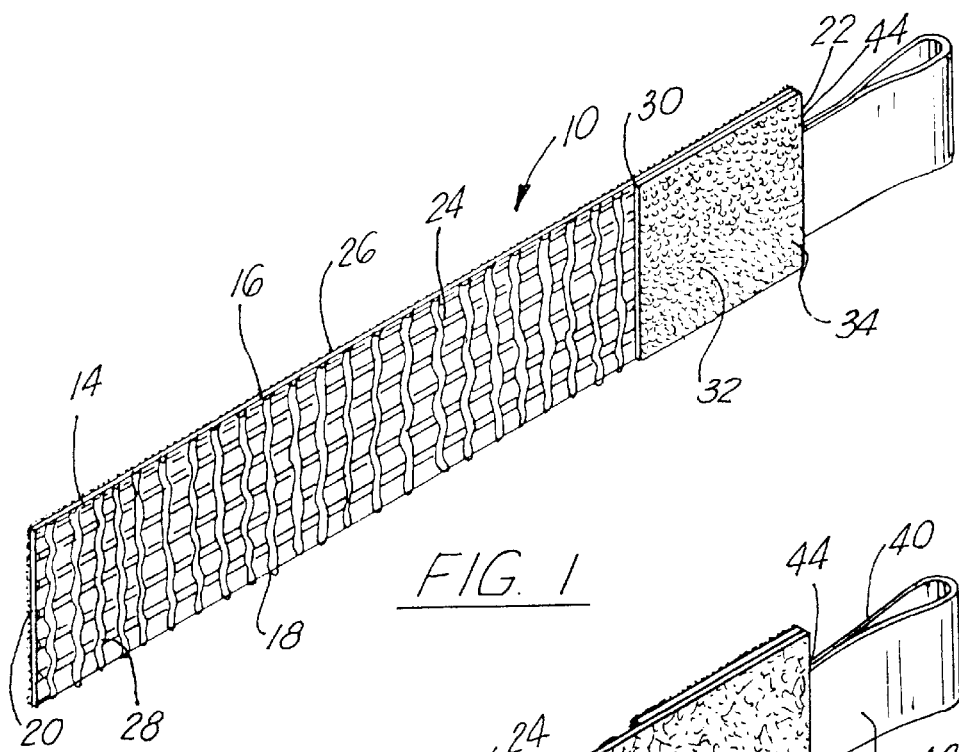
FIG. 1 illustrates an overall front view of the preferred embodiment of the apparatus of the present invention.

FIGS. 1–8 illustrate the preferred embodiments of the apparatus of the present invention by the numeral 10. Turning now to the principal embodiment as illustrated in FIGS. 1–3 and 7, there is illustrated apparatus 10 which is defined as a substantially rectangular planar member 14 having a pair of longitudinal edges 16, 18 and a pair of side edges 20, 22, including a front surface 24 and a second or rear surface 26 which would define the planar member 14. As illustrated for example in FIG. 1, the first surface or front surface 24 of planar member 14 would generally comprise a non-slip rubber-like material 28 which would extend substantially from the forward side edge 20 between the longitudinal edges 16, 18 to substantially ¾ of the length of planar member 14 terminating at point 30. The non-slip rubber-like material 28 would be the type that is commonly referred to as high blown PVC material which would have the characteristics of being a soft rubber-like material which would be anti-slip and would frictionally engage most surfaces, including the smooth surface of a fishing rod or the like as will be described further. as further illustrated, the front surface 24 of planar member 14 would further include a substantially rectangular portion which would cover approximately the final ¼ portion of its front surface 24 identified as surface 32. Surface 32 would comprise a multitude of miniature loop members 34, of the type that would make up one of the surfaces of the product commonly known as Velcro® or the like. Although Velcro® is utilized in the principal embodiment of the present invention, it is foreseen that any type of product having essentially the same features as Velcro®, that is, two surfaces which may generally adhere together, may be substituted in place of Velcro®. The purpose of surface 32 will be described further.

Figure 2:
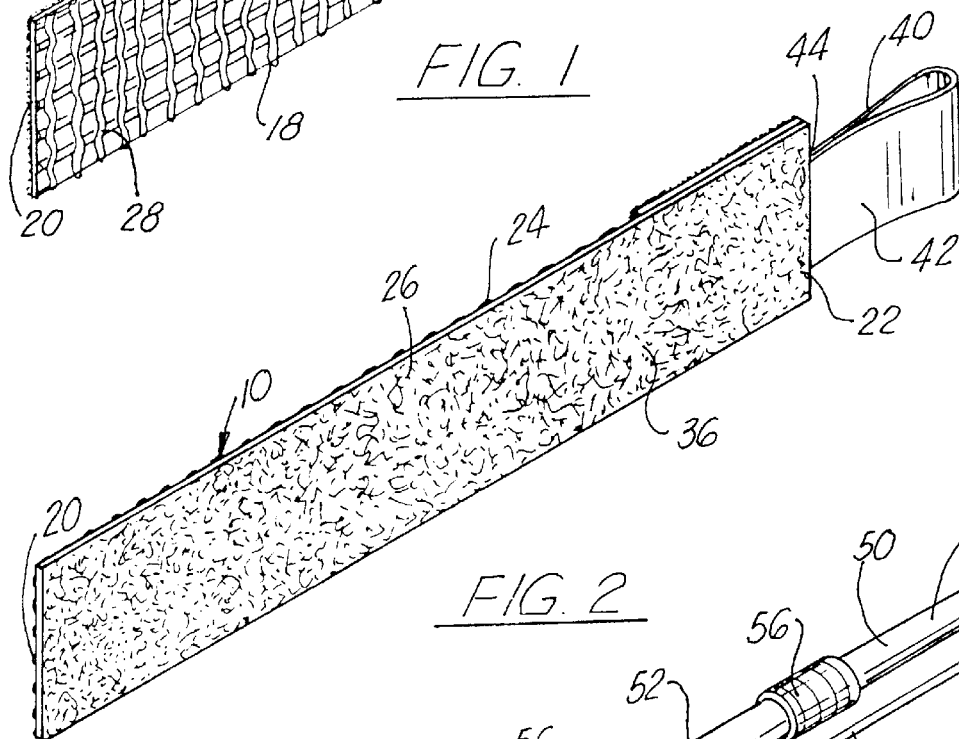
FIG. 2 illustrates a rear view thereof.

Turning now to FIG. 2, FIG. 2 illustrates the rear or second surface 26 of planar member 14 which would generally comprise a plastic fuzzy-like material 36 which would generally cover the entire rectangular rear surface 26 of member 14, and would be substantially adhered to the rubber-like surface 28 of planar member 14 through gluing or the like. As was explained earlier, the fuzzy material 36 would generally comprise the second component of the material known as Velcro® or the like, and would work in conjunction with the surface 32 as will be explained further. Another feature of the apparatus as generally seen in FIGS. 1 and 2 is a tab member 40 which would comprise a length of material 42 folded back upon itself with the end members 44 of member 40 glued or sewn into the edge portion 22 of planar member 14 so that the tab member could be used as a release to be explained further.

Figure 3:
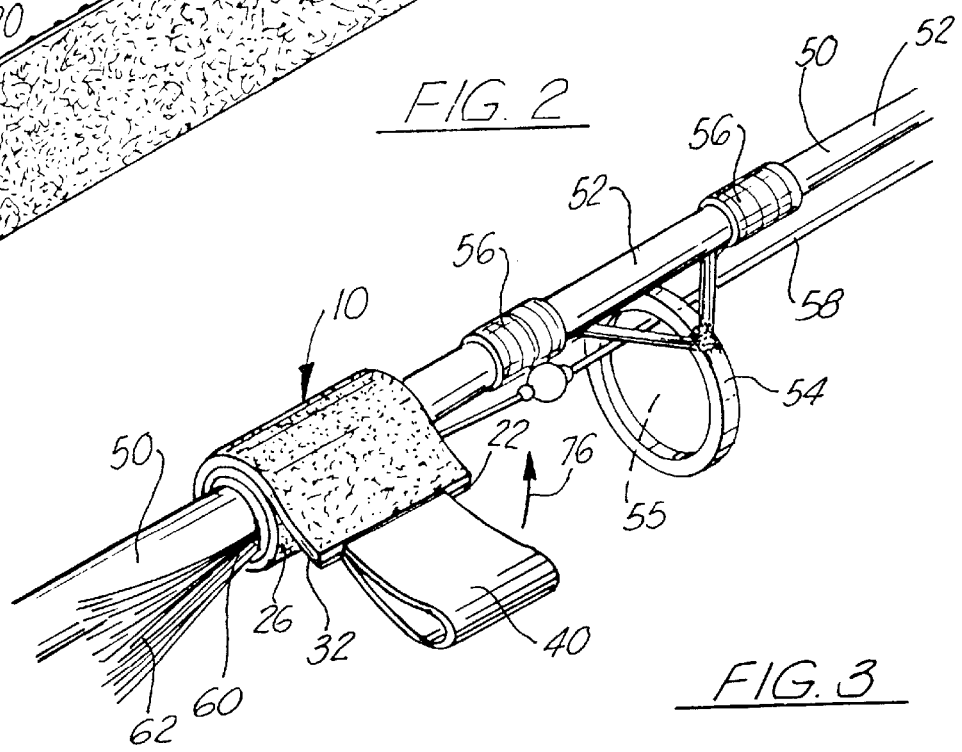
FIG. 3 illustrates the preferred embodiment of the apparatus of the present invention wrapped around a rod component and a fishing lure.

Turning now to FIG. 3, there is seen in partial view the planar member 14 as it is forseen to be used as the present invention. As seen in FIG. 3, there is a partial view of a fishing rod 50 of the type having a continuous annular surface 52 constructed of a very slick smooth material such as plastic or the like, which would enable it to be pliable. As seen in this portion of the rod 50, there is a eyelet member 54 secured to the rod surface 52 through wrapping or the like 56 to secure the eyelet 54 in place. As illustrated, there is a fishing line 58 which would be nylon or the like material threaded through the bore 55 of eyelet 54 with fishing line 58 terminating in a lure member 60, the tail 62 of which can be seen in partial view in FIG. 3. As illustrated, the planar member 14 of the present invention has been completely wrapped around the portion of the rod 50 with the member 14 also encasing the body of lure 60 thereunder.

Figure 7:
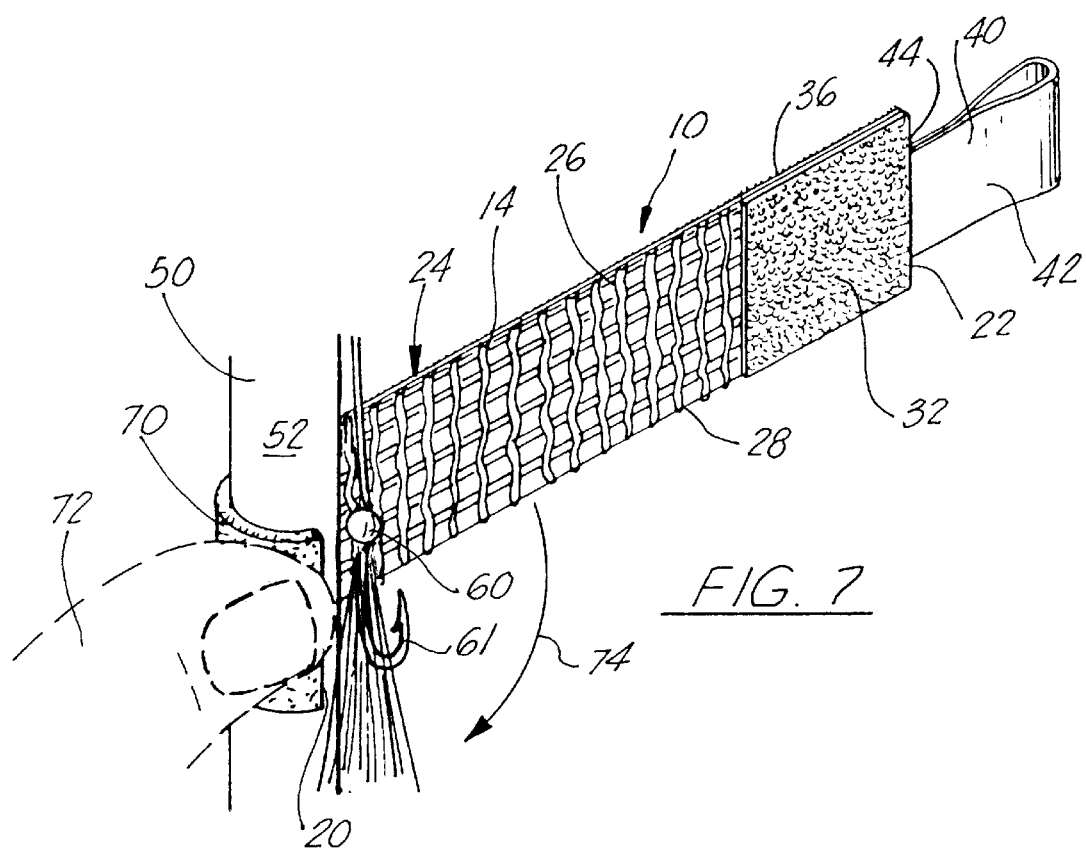
FIGS. 7 and 8 illustrate the views of the apparatus of the present invention being wrapped around a rod with a first end being engaged against the surface of the rod by the thumb of the user.

One must turn now to FIG. 7 for an explanation of how the wrapping device 10 as illustrated in FIG. 3 came about in that position. Reviewing FIG. 7, again there is apparatus 10 which illustrates the planar member 14 having the non-skid interior or rear surface 26 and the front or Velcro®-like surface 24. There is further illustrated the tab member 40 extending from one edge 20 of the planar member with the second edge 22 of the planar member 14 being held against the fishing rod 50 by the thumb 72 of a user. As illustrated, the soft, non-skid front material 28 of the member 14 is being held against the surface 52 of rod 50 by thumb 72. In this manner, although the surface 52 of the rod 50 is rather slick, the non-skid characteristic of rubber-like material 28 frictionally engages against the surface 52 of rod 50 and it is held in place and it will not move. Subsequently, the planar member 14 is then wrapped around rod 50 in the direction of arrow 74 with the lure 60 in full view in FIG. 7. However, as planar member 10 is wrapped there around, the inner surface 28 of planar member 14 would wrap around rod 50 and lure 60 and encapsulate lure 60 and press it against the surface 52 of rod 50. As the member 14 is wrapped further around, surface 28 would engage the upper surface 24 of member 14 and one could then remove one's thumb 72 and the member would continue to wrap around itself until the loop surface 32 of member 14 would engage the fuzzy material surface 36 of member 14 and the two would serve as the Velcro® or the like attachment for securing the member 14 around rod 50 and lure 60, the result of which is illustrated in FIG. 3. In this configuration as seen in FIG. 3, line 58 is held taut along the length of rod 50 and with lure 60 engaged by member 14 as illustrated, there is no chance for the hook 61 on the end of lure 60 to engage either a person or to engage another line 58 of another rod 50 and in getting tangled therewith. Therefore, the mission of maintaining the line taut and the lure and hook securely wrapped in member 14 has been accomplished.

Continuing on to a description of the member 14 as seen in FIG. 3, in the event one wishes to disengage member 14 from around rod 50, one would simply grab tab 40 between one's finger and thumb and pull in the direction of arrow 76 as seen in FIG. 3, which would immediately release the contact between surface 24 and surface 32 of member 14 and break the Velcro® contact therebetween and member 14 would then be unwrapped from rod 50 and the lure 60 and hook 61 would be free to be utilized for fishing.

Figure 4:
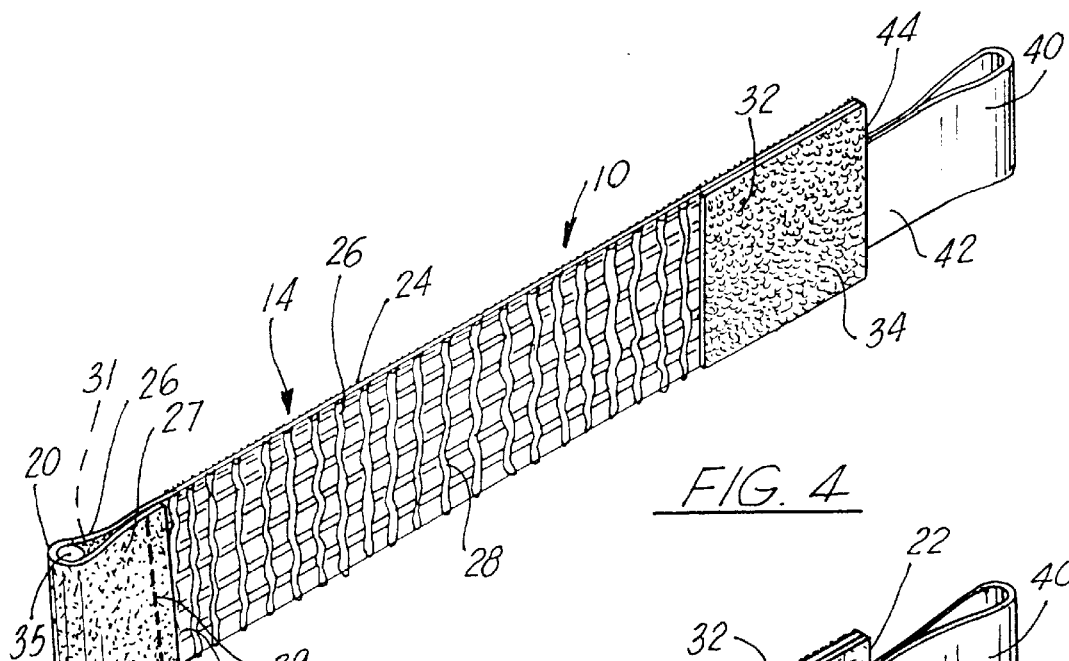
FIG. 4 illustrates an overall view of an additional embodiment of the apparatus of the present invention.
Figure 5:
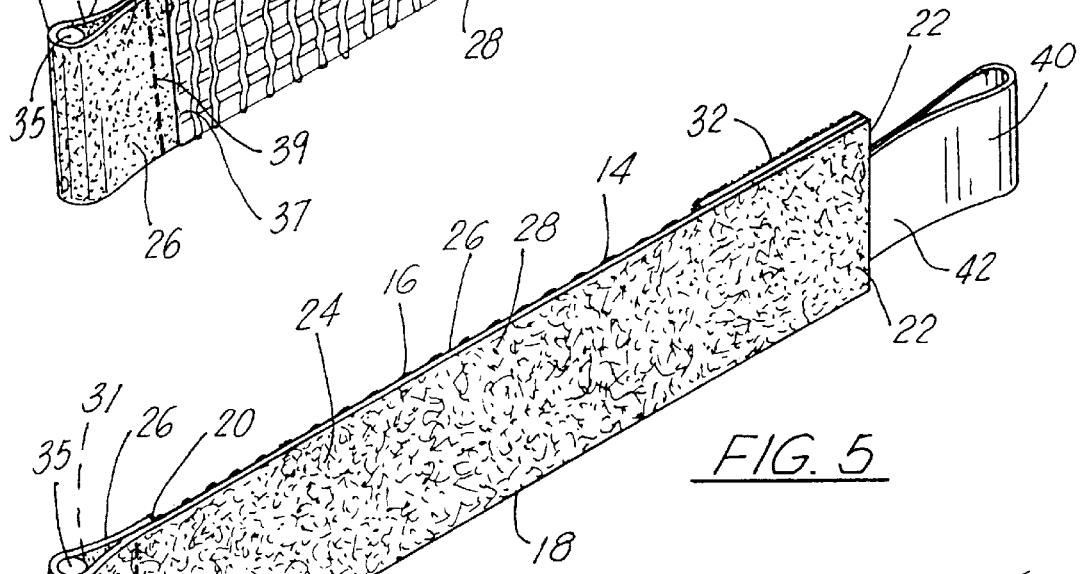
FIG. 5 illustrates a rear view thereof.

Turning now to FIGS. 4 through 6 and 8, the apparatus is again seen in an additional embodiment which, although may appear to be quite similar to the principal embodiment as seen in FIGS. 1–3 and 8, does have a significant difference. Again, as illustrated in FIG. 4, planar member 14 includes its forward surface 24, rear surface 26 having non-skid material 28, with the forward surface 24 again being comprised of the fuzzy like material as is the similar surface in FIG. 1 and FIG. 2. Further, again there is illustrated along second surface 26 the loop surface 32 which has the multitude of minute hook loop members 34 which serve to when pressed against surface 24 form the Velcro® contact as was described earlier. As with the principal embodiment in FIG. 1, there is also provided the tab member 40 with surface 42 engaged along edge 22 and sewn or glued therein. Therefore, for most of the configuration of the embodiment in FIGS. 4–6, it is quite similar to the principal embodiment. However, reference should be made to the second edge 20 of apparatus 10 as seen in FIG. 4. In this particular view, the surface 26 of apparatus 10 which again is the fuzzy like material which makes up part of the Velcro® configuration has been doubled up upon itself to form a fuzzy end area 27 on the front face 24 of apparatus 10. Upon folding upon itself, it defines an opening 31 wherein a "lever" 35 is engaged where upon the edge 37 of surface 24 is then attached upon itself either sewing or the like as illustrated by seam line 39 in FIG. 4. In FIG. 5 there is illustrated the same configuration as seen in FIG. 4 except that the front surface 24 is shown more clearly in this FIGURE but again, it is clear that the lever 35 is secured within the opening 31 formed by the surface 24 being folded back upon itself and sewn or bonded by flexible bond along seam line 39 as illustrated.

Figure 6:
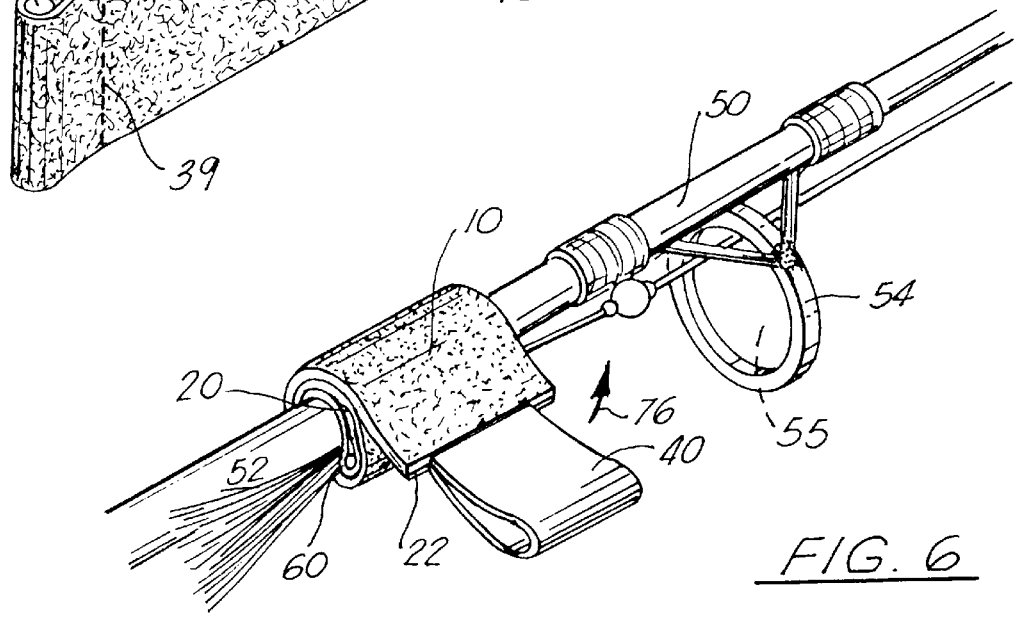
FIG. 6 illustrates the additional embodiment of the present invention wrapped secured around a portion of a rod and lure and wrapped upon itself for securing it in place.
Figure 8:
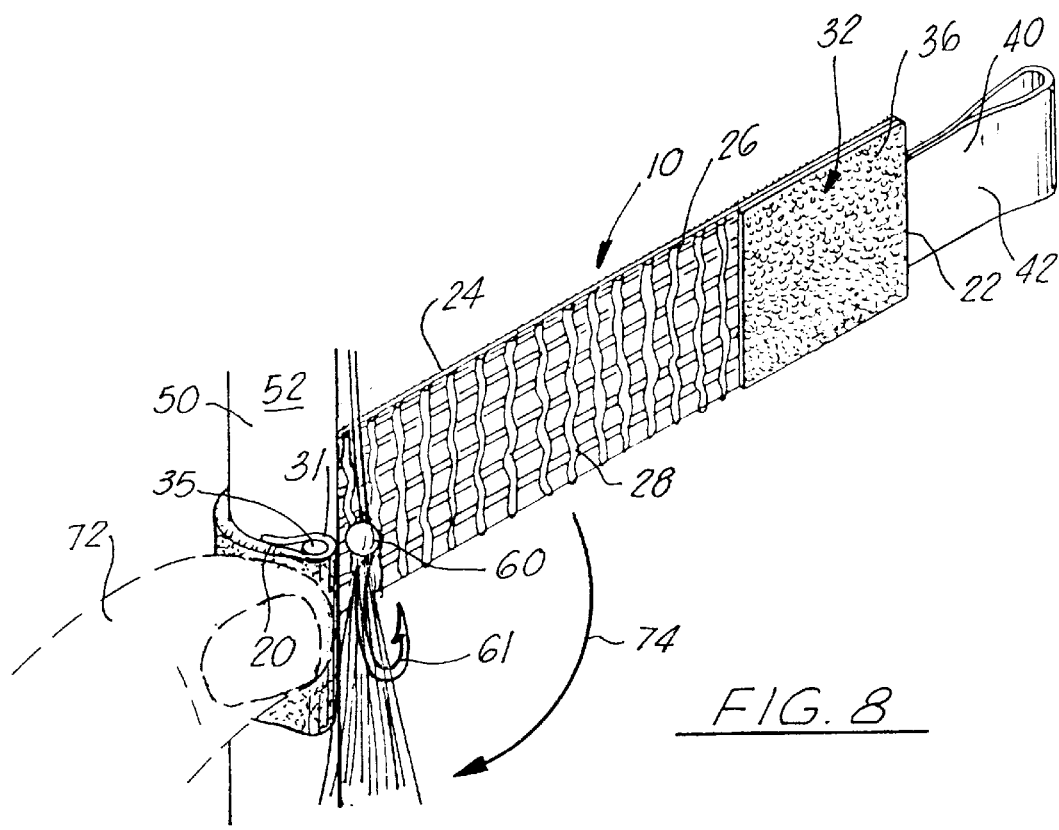

FIGS. 8 and 6 illustrate the reason why the lever member 35 is an important part of this embodiment of the present invention. As seen in FIG. 8, as was discussed earlier for FIG. 7, member 14 again is secured against the surface 52 of rod 50, with the non-skid surface 28 engaged thereupon and held in place by thumb 72. However, in this particular embodiment, it is foreseen that this embodiment would be particularly useful to a person who would suffer from some sort of a debilitating muscular problem such as arthritis or the like where one could not hold the edge 20 of member 14 in place easily as seen in FIG. 7. Therefore, in FIG. 8, one would take the end 20 of the member 14 having the lever 35 and would press one's thumb 72, if one could, against the lever 35 which would provide an additional holding surface for the thumb 72 to hold the member 14 in place against the rod 50. Therefore, once in place with holding one's thumb 72 firmly against the lever 35 contained within loop 31, the planar member 14 could then be wrapped in the direction of arrow 74 as was described earlier for FIG. 7 engaging lure 60 and hook 61 there within, and wrapped completely around the rod 50 as seen clearly in FIG. 6. Again, as was discussed earlier, when one would wish to release member 14 from engagement around rod 50 and lure 60, one would simply grasp tab member 40 and move it up in the direction of arrow 76 where the Velcro® components would disengage and the planar member 10 would then be able to unwrap from around rod 50 and lure member 60 so that these items would be ready for use in fishing.

Although as seen in the drawings and previously discussed, the principal use of the apparatuses as foreseen would be in the context of using with a rod and reel assembly, it is foreseen that the planar member 14 in the embodiments as discussed could be used for any type of tubular member which had a continuous smooth surface, but where one would wish to wrap the planar member 14 there around in order to secure something against it, whether it be other tubular members. If that were the case, then the planar body could be configured into any width and lengths and could be manufactured with or without the tab member 40, depending on one's purpose. For example, it is foreseen that one may wish to secure extension cords, computer cables, lengths of PVC pipe or other types of materials through the use of the planar member with the non-skid surface and the Velcro® components in the second surface.

I claim:

1. A wrapping device for elongated tubular members, including fishing rods, the wrapping device comprising:

a) a substantially planar member having first and second surfaces;

b) at least a portion of said first surface of said planar member securable to a first portion of said second surface;

c) a second portion of said second surface covered with a non-slip rubberized material, said second portion of said second surface being larger than said first portion of said second surface;

d) said non-slip rubberized material adherable to a surface of said elongated tubular members so that the planar member is wrapped around said elongated tubular members, and the portion of said first surface adheres to the first portion of said second surface, for maintaining the planar member tightly wrapped around said elongated tubular members; and e) a lever member secured to at least a first end of the planar member for holding the planar member in place against the tubular members as the planar member is wrapped around the tubular members to avoid slippage as the planar member is secured around the tubular members.

2. The device in claim 1, wherein the planar member is of sufficient length to wrap around the elongated tubular members and wrap around a lure at the end of fishing line extending from the elongated tubular members, in order to secure the lure against the elongated tubular members.

3. The device in claim 1, wherein non-slip rubberized material comprises high blown PVC.

4. The device in claim 1, wherein the portion of the first surface and the first portion of the second surface which adhere to one another comprise plastic fuzzy material and plastic loops, together commonly known as Velcro®.

5. The device in claim 1, wherein the planar member is formed to various dimensions for securing various components when wrapped.

6. The device in claim 1 further comprising a tab member, secured to at least a second end of the planar member for releasing the member after the member has been wrapped around the elongated tubular members and adhered thereto.

7. A device for wrapping around tubular members, comprising:
   a) a substantially planar member having first and second surfaces;
      i) said first surface coated with a plastic fuzzy loop material;
      ii) said second surface having a first portion of a plastic hook material and a second portion of a non-slip rubberized material, the first portion being smaller than the second portion in dimension;
      iii) said non-slip rubberized material adherable to a smooth surface of said tubular members, so that when the planar member is wrapped around the tubular members, the planar member does not slip along the surface of the tubular members, so that when the wrapping is complete, the first surface adheres to the first portion of the second surface, and maintains the planar member tightly wrapped around the tubular members; and
   b) a lever member, secured to at least one end of the planar member for holding the planar member in place against the tubular members as the planar member is wrapped around the tubular members to avoid slippage as the planar member is secured around the tubular members.

8. The device in claim 7, wherein the planar member is of sufficient length to wrap around several tubular members to hold them together by said planar member.

9. The device in claim 7, wherein non-slip rubberized material comprises high blown PVC.

10. The device in claim 7, wherein the plastic fuzzy loop material and the plastic hook loops comprise the material commonly known as Velcro®.

11. The device in claim 8, wherein the planar member is formed to various dimensions for securing various components when wrapped.

12. A wrapping device in combination with tubular members, comprising:
   a) the tubular members to be wrapped;
   b) a substantially planar member having first and second surfaces;
   c) at least a portion of said first surface coated with a plastic fuzzy material;
   d) said second surface having a first portion comprising plastic loops and a second portion comprising non-slip rubberized material, the first portion being smaller than the second portion in dimension;
   e) said non-slip rubberized material adherable to a smooth surface of said tubular members, so that when the planar member is wrapped around the tubular members, the planar member does not slip along the surface of the tubular members, and the first portion of the first surface is able to adhere to the first portion of the second surface, and maintains the member tightly wrapped around the tubular members; and
   f) a lever member, secured to at least one end of the planar member for holding the planar member in place against the tubular members as the planar member is wrapped around the tubular members to avoid slippage as the planar member is secured around the tubular members.

13. The device in claim 12, wherein the planar member is wrapped around numerous tubular members including wire, pipe and hosing.

14. The device in claim 12, wherein when the member is wrapped around the tubular members which comprise a fishing rod, the member can also wrap around a fishing lure having a hook, so that the hook and lure are contained within the wrap around the tubular members, and not left exposed.

15. The device in claim 12, wherein the planar member is formed to various lengths and the lever is secured at any point along its length to provide a planar member of a particular length.

16. A wrapping device in combination with a fishing rod, comprising:
   a) the fishing rod having a fishing line with a lure on an end of the fishing rod, and extending therefrom;
   b) a substantially planar member having first and second surfaces, said planar member securable around a portion of the fishing rod;
      i) at least a portion of said first surface coated with a plastic fuzzy loop material;
      ii) said second surface having a first small portion comprising plastic hook material and a second portion, greater in size than said first small portion, comprising non-slip rubberized material;
      iii) said non-slip rubberized material adherable to a smooth surface of said fishing rod, so that when the planar member is wrapped around the fishing rod, the planar member does not slip along the surface of the fishing rod, and the planar member is wrapped around the fishing rod and the lure at the end of the fishing line, said first surface of said planar member adhering to the first small portion of the second surface, and maintaining the planar member tightly wrapped around the fishing rod and the fishing lure; and
   b) a lever member, secured to at least one end of the planar member for holding the planar member in place against the fishing rod as the planar member is wrapped around the fishing rod to avoid slippage as the planar member is wrapped there around.

* * * * *